United States Patent [19]

Davis et al.

[11] 4,075,691
[45] Feb. 21, 1978

[54] COMMUNICATION CONTROL UNIT

[75] Inventors: John Stephen Davis, Glendale; Kenneth Norman Larson, Thousand Oaks; Frank William Phalen, Canoga Park, all of Calif.

[73] Assignee: Bunker Ramo Corporation, Oak Brook, Ill.

[21] Appl. No.: 629,510

[22] Filed: Nov. 6, 1975

[51] Int. Cl.² .......................... G06F 3/04; G06F 5/04
[52] U.S. Cl. .................................................. 364/200
[58] Field of Search .................. 340/172.5; 445/1; 364/200 MS, 900 MS

[56] References Cited

U.S. PATENT DOCUMENTS

| 3,409,880 | 11/1968 | Galler et al. | 340/172.5 |
|---|---|---|---|
| 3,560,935 | 2/1971 | Beers | 340/172.5 |
| 3,588,831 | 6/1971 | Figueroa | 340/172.5 |
| 3,593,299 | 7/1971 | Driscoll et al. | 340/172.5 |
| 3,771,134 | 11/1973 | Huettner et al. | 340/172.5 |
| 3,810,105 | 5/1974 | England | 340/172.5 |
| 3,828,325 | 8/1974 | Stafford et al. | 340/172.5 |
| 3,842,405 | 10/1974 | Key et al. | 340/172.5 |
| 3,934,232 | 1/1976 | Curley et al. | 340/172.5 |

Primary Examiner—Mark E. Nusbaum
Attorney, Agent, or Firm—F. M. Arbuckle; A. Freilich

[57] ABSTRACT

A communication control unit useful for operably coupling a plurality of peripheral devices to a data processing system including a central processing unit (CPU) and a main system memory. The communication control unit is comprised of three major sections: (1) A direct memory access module (DMA) for communicating with the memory of the CPU; (2) A serial interface adaptor module (SIA) for converting parallel data to serial data for transmission to a peripheral device and serial data to parallel data on receiving from a peripheral device; and (3) A programmable controller module (PCM) connected between the DMA and SIA for providing the overall control of message reception and transmission. The PCM comprises a small special-purpose programmable parallel computer. A program (firmware) stored in a read-only memory of the PCM enables the PCM to handle the different communication disciplines observed by various peripheral devices operable with the communication control unit. The program may be considered as containing two levels of instructions. The first level consists of a control program containing common routines and control programs that are used by the various communication disciplines. The second level of firmware contains all communication discipline dependent instructions associated with the processing of transmit or receive characters according to the particular discipline. Just as the first level programs are used by all the communication disciplines, the application dependent programs in the second level are used by all channels on the PCM I/O bus that communicate according to the discipline represented by the instructions of these programs.

5 Claims, 6 Drawing Figures

COMMUNICATION CONTROL UNIT

BACKGROUND OF THE INVENTION

This invention relates generally to digital computer on-line data management systems and, more particularly, to a communication control unit for facilitating effective communication between multiple peripheral devices employing different communication disciplines and the system's main memory.

The term "communication (or line) discipline" may be defined as the set of rules or criteria governing the message format utilized by a particular peripheral device. Exemplary factors distinguishing one discipline from another involve, for example, synchronization, start and end of message sequence, message segment length, etc. Many different communication disciplines have evolved which are now well-known amongst those skilled in the art. The following list comprises only a small portion of those disciplines which might be of interest in a typical on-line data management system:

| (1) VIP | Visual Image Projection Terminal (Honeywell) |
|---|---|
| (2) DN355 | Datanet 355 (Honeywell) |
| (3) Baudot TTY | ITA Number Two Teletypewriter |
| (4) ASCII TTY | ASCII Teletypewriter - Odd or Even Parity |
| (5) BISYC | Point-to-Point Binary Synchronous Communications |

Due to the lack of standardization amongst the various communication disciplines, it is generally necessary for a system to include separate communication controllers to accommodate each different discipline to be handled by the system. In some data management applications, it is not unusual for a system to have to accommodate six or more types of major network disciplines plus a multitude of other disciplines for specialized terminals and peripheral devices. To aggravate the problem further, new disciplines are continually being developed which, in turn, require that a new controller be designed, if an existing system capability is to be expanded to accommodate the new discipline.

SUMMARY OF THE INVENTION

In view of the foregoing, the present invention is directed to a communication control unit capable of efficiently handling multiple communication disciplines and which can be easily and inexpensively modified to handle new communication disciplines.

Briefly, in accordance with the present invention, a communication control unit is provided including a programmable control module (PCM) or microcomputer containing a read-only memory for storing a control program. The program stored in read-only memory, typically referred to as firmware, is structured in two levels. The first level consists of a control program which contains common and control routines that are used by all line disciplines. The second level of firmware contains all line discipline-dependent instructions associated with the processing of transmit or receive characters according to a particular communication discipline. Just as the first level of programs is used by all line disciplines, the application-dependent programs in the second level are used by all channels on the PCM data bus that communicate according to the line discipline represented by the instructions of these programs.

The preferred embodiment of the invention disclosed herein is the BR 1569 communication control unit manufactured by the Bunker Ramo Corporation, Electronic Systems Division, Westlake Village, California. A single CCU interfaces up to thirty-two full duplex serial data communication channels to a computer system, such as the PDP 11 which is a widely-used computer system manufactured by Digital Equipment Corporation, Maynard, Massachusetts. The PDP 11 is characterized by its so-called Unibus organization which enables the BR 1569 to operate with direct access to the PDP 11 main memory. Although the present invention is disclosed herein as a BR 1569 for use with a PDP 11 as the preferred embodiment, it should be understood, of course, that the present invention is not limited to any particular computer system but that embodiments of the invention can indeed be utilized with essentially any computer system having a direct memory access capability.

DESCRIPTION OF A PREFERRED EMBODIMENT

Figure 1:
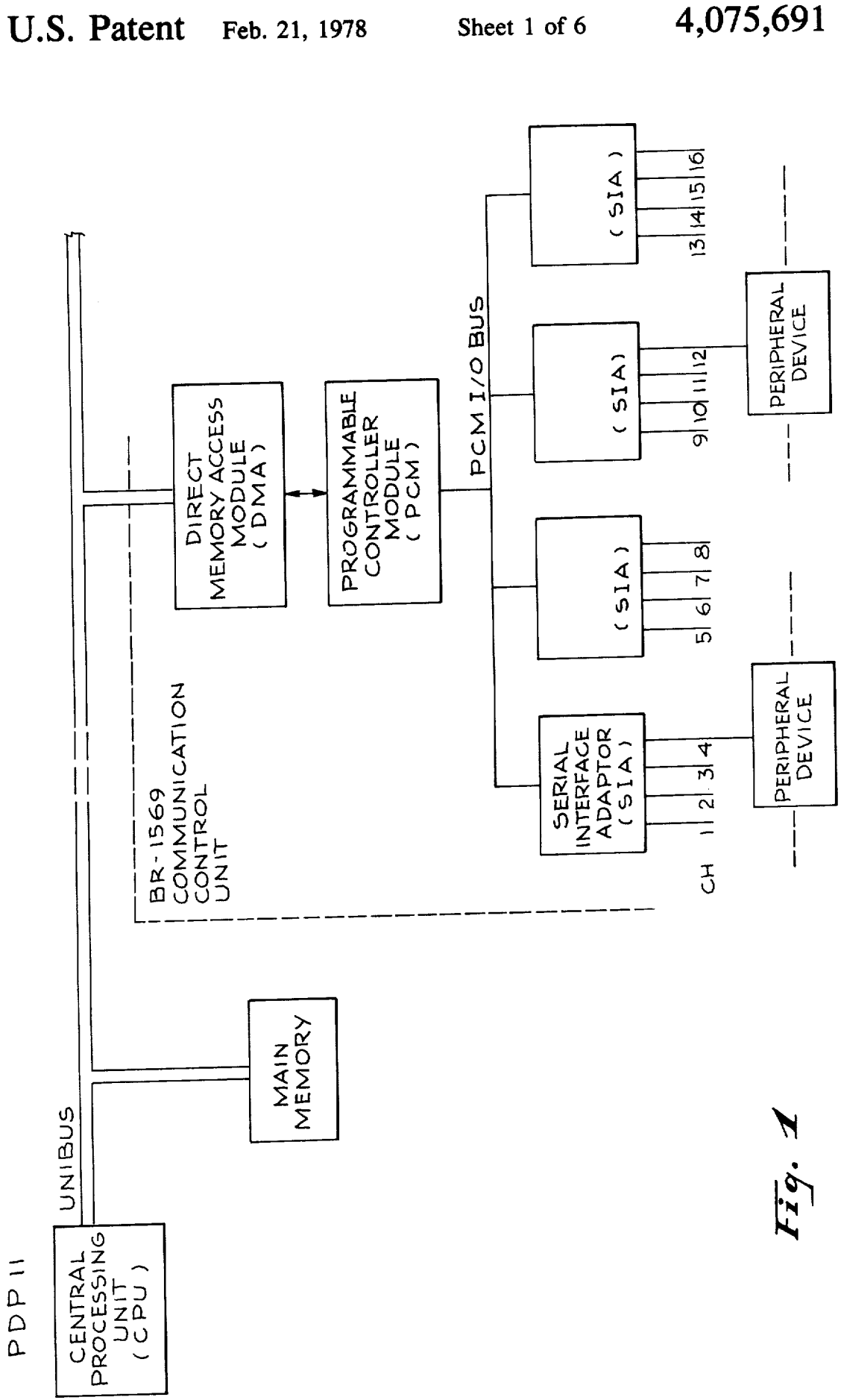
FIG. 1 is a block diagram of a data processing system incorporating a communication control unit in accordance with the present invention.

Attention is initially directed to FIG. 1 which depicts in block form a PDP 11 data processing system incorporating a BR 1569 communication control unit (CCU) in accordance with the present invention. As previously noted, the PDP 11 system is manufactured by Digital Equipment Corporation, Maynard, Massachusetts. The PDP 11 system is illustrated in FIG. 1 as including a central processing unit (CPU), a data bus (Unibus), and a main memory. The BR 1569 CCU is manufactured by the Bunker Ramo Corporation, Westlake Village, California. Briefly, the CCU is comprised of three major sections: (1) either one or two direct memory access modules (DMA) BR 1008; (2) either one or two programmable controller modules (PCM) BR 1003; and (3) one or more serial interface adaptors (SIA) BR 1086.

The BR 1569 comprises a direct memory access device that connects to the PDP 11 Unibus and, therefore, can receive data, address, and control signals from the Unibus and send data, address, and control signals to the Unibus. This permits the BR 1569 to receive and send data to the PDP 11 core memory in 16-bit words. The PCM is a programmable controller that receives and sends addresses, data, and commands from and to the DMA in 8-bit characters. After processing the data or commands, the PCM performs required functions and sends or receives the data or commands to or from the SIA via an 8-bit data bus. The SIA converts the 8-bit character to serial data, after code conversion, if required, for transmission to the appropriate channel or receives the serial data and converts it to 8-bit characters with code conversion, if required, on receiving.

Each SIA is coupled to four separate channels which may each connect to a peripheral device such as a CRT terminal, line printer, teletypewriter, etc. Although a single BR 1569 can interface with up to thirty-two channels, for simplicity in explanation herein, the invention will be disclosed as a 16-channel CCU including one DMA and one PCM, as depicted in FIG. 1.

In addition to the aforementioned functions performed by the PCM, the PCM performs the necessary message framing and start and end of message tasks automatically thereby greatly alleviating the tasks normally required of the PDP 11 for communication.

Figure 2:
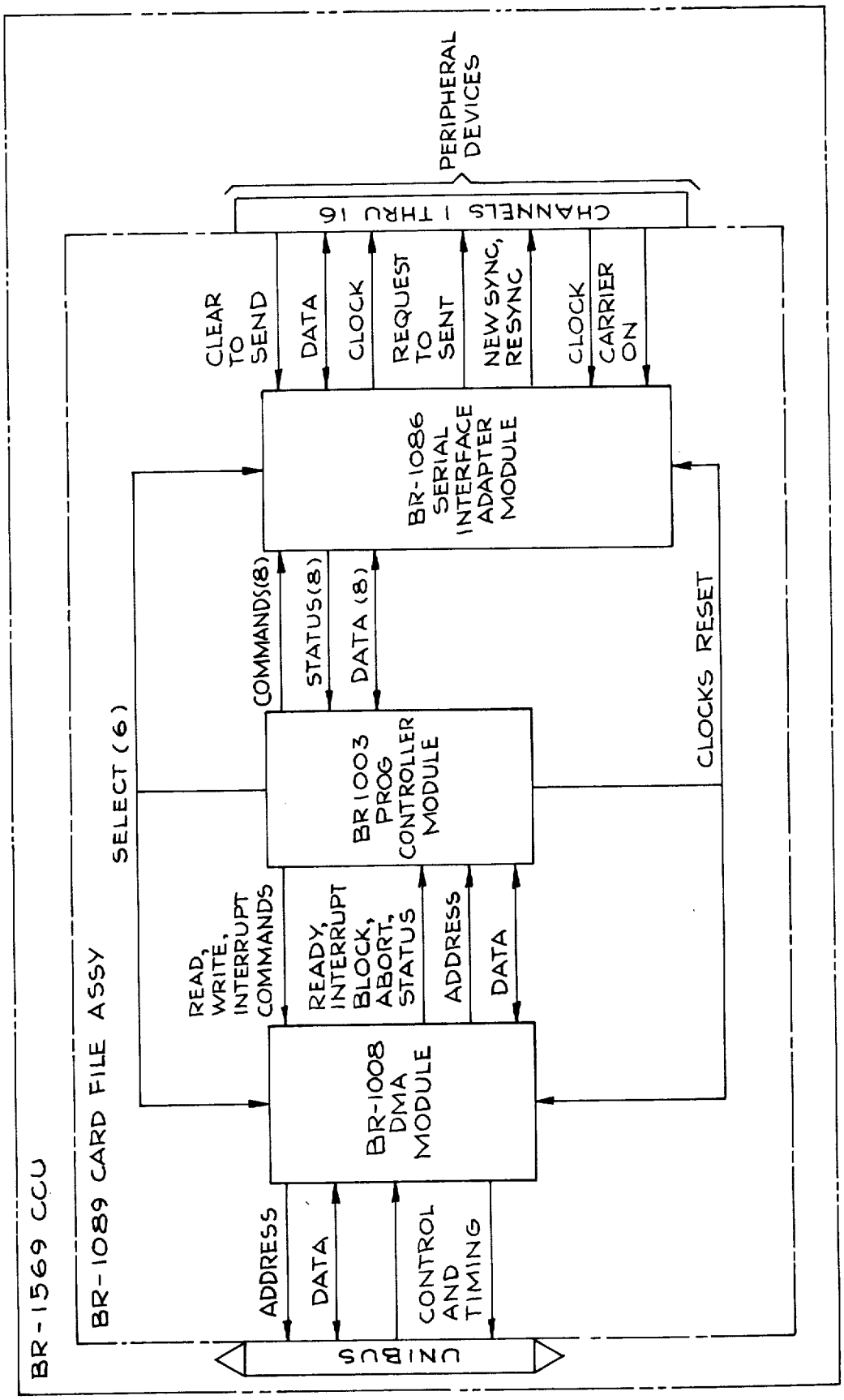
FIG. 2 is a block diagram of the communications control unit of FIG. 1.

The block diagram of FIG. 2 represents essentially the same structure as that illustrated in FIG. 1 except, however, it additionally shows the various interface signals between the Unibus, DMA, PCM, and SIA to thereby illustrate the basic functions performed by the communication control unit in accordance with the present invention.

In order to understand the overall system operation, and prior to considering the detailed structure and functions of each of the three major control unit sections, i.e., DMA, PCM, and SIA, it is appropriate to review the requirements of a direct memory access device on the Unibus of a PDP 11 computer. First, the information to be sent or received either resides in or will be stored in the PDP 11 main core memory. Secondly, arbitration control of the Unibus is at all times maintained by the PDP 11 CPU. Thus, any device on the Unibus uses either a Data (IN) or Data (OUT) command followed by the necessary data and address locations to transfer data into or out of core memory. For example, when the BR 1569 is transmitting data to a peripheral device and needs data from core memory to do so, the DMA in the 1569 obtains the Unibus from the CPU via a non-processor request (NPR) and issues:

(1) Data (IN) command (2) The DMA generates the starting address in core memory.

(3) The DMA receives the sixteen-bit data word from core memory.

On the other hand, when the 1569 is receiving data from a peripheral device and needs to store data in core memory, the BR 1569 must provide:

(1) Data (OUT) command (2) The DMA generates the starting address in core memory.

(3) The DMA sends the sixteen-bit data word to core memory.

As each sixteen-bit Unibus word is received by the DMA, it is buffered in memory in the PCM in eight-bit characters. At the same time, the characters are serially shifted out by the SIA. The DMA is then directed by the PCM to fetch another word from core via an NPR. The arbitration logic in the PDP 11 CPU grants the Unibus to the BR 1569 and the DMA then places the address on the Unibus and receives the data word from core.

Figure 3:
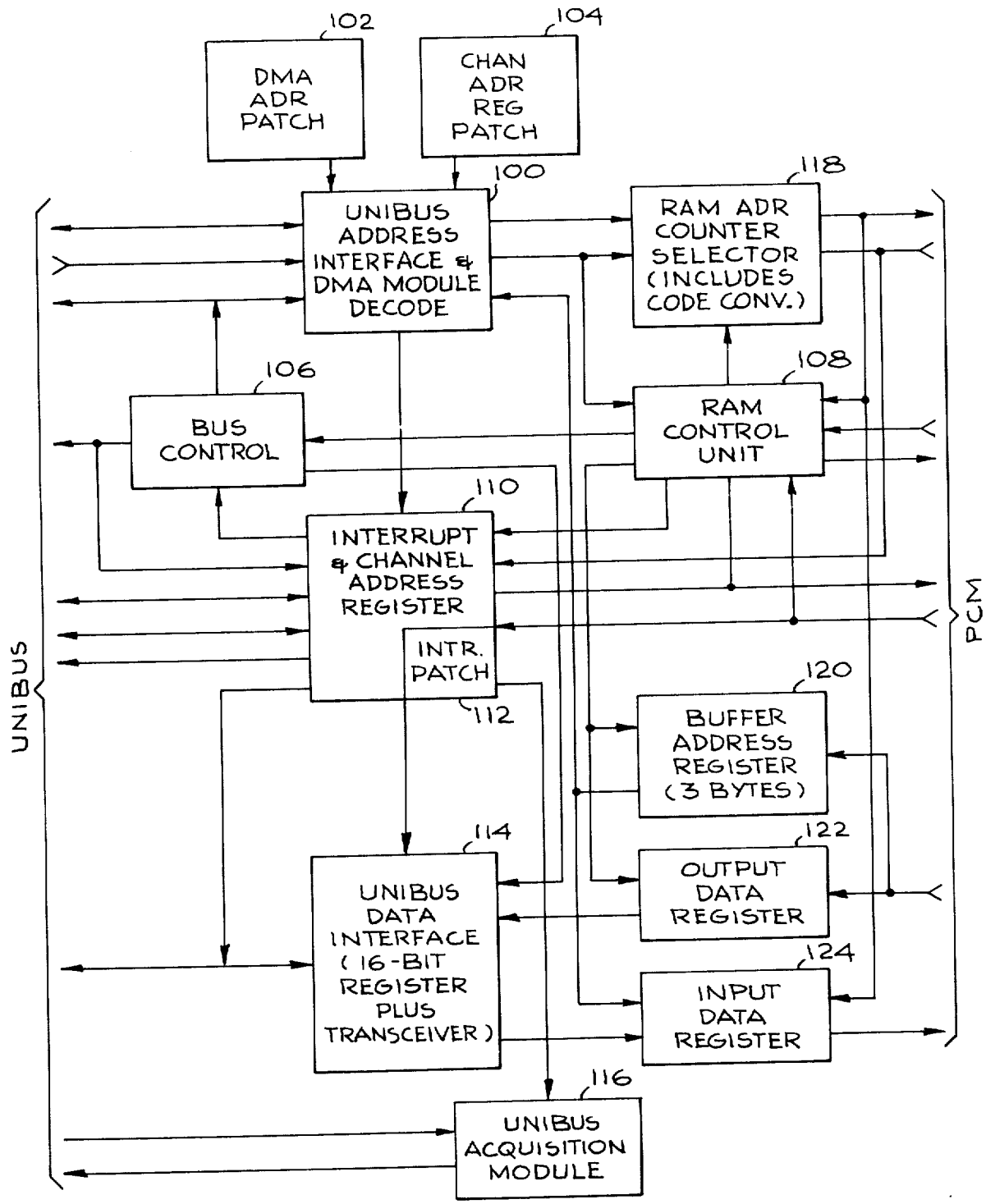
FIG. 3 is a block diagram of the direct memory access module (DMA) of FIGS. 1 and 2.

Attention is now directed to FIG. 3 which illustrates a block diagram of the DMA module of FIGS. 1 and 2. Similar direct memory access modules are known in the art. The improvement in accordance with the present invention resides primarily in the PCM and its use in combination with the DMA and SIA to comprise a communication control unit capable of efficiently operating with multiple line disciplines.

The DMA of FIG. 3 includes a Unibus address interface and DMA module decode circuit group 100 which is comprised of the bus transceivers required to accept and present address information of the Unibus. Additionally, decoding logic is included for responding to a range of addresses applied to the Unibus. The addresses which activate the DMA are established with jumper wires added to the connector backplane. These are decoded by the DMA address patch block 102 and the channel address register patch block 104 in FIG. 3. The address is strapped into the backplane select active registers in the PCM plus a channel address register in the DMA.

The DMA further includes a bus control module 106 which governs DMA data transfers. This control module responds to non-processor requests (NPRs; a DMA data transfer function) generated by the RAM control unit 108. Actions controlled on the Unibus by the bus control module 106 are in master mode with the data source or datasink device operating as a slave. The bus control module 106 primarily serves to provide the timing and necessary delays required to process NPR cycles. The bus control module 106 applies a strobe line and a control line to the Unibus.

The interrupt and channel address register block 110 provides the hardware necessary for responding to interrupt commands initiated by the PCM. The interrupt operation consists of requesting the Unibus via the bus acquisition module 116. Once bus acquisition is complete, an interrupt vector address is placed on the data lines simultaneously with the CPU bus interrupt signal. A block interrupt signal is presented to the PCM until it is cleared by the CPU reading the channel address register or else by the PCM pulsing the reset line. Interrupt vector addresses are strapped with the interrupt patch circuitry 112 represented in FIG. 3. Block 110 includes a 6-bit channel address register which contains the contents of the select lines that were present when an interrupt occured. This register is a read-only register used by the CPU program to determine which device generated the last interrupt. When this register is read by the program, device interrupts are unblocked.

The Unibus data interface block 114 consists of the necessary transceivers required to accept 16 bits of data from the Unibus and apply data to the Unibus. Also included in this module is a 16-bit input data register. This register is used to trap bus data in order to allow releasing the Unibus while the data is being broken down into 8-bit characters.

The Unibus acquisition module 116 is used to gain control of the Unibus when either NPR or interrupt cycles are requested. This module will pass bus and NPR grants to down-line peripherals on the Unibus if either an NPR or interrupt request is pending.

The RAM address counter/selector 118 functions to apply a 10-bit address code to the PCM which selects specific hardware registers or locations in random access memory. Either the Unibus address or the device select code serves to define the address applied to the PCM. During direct memory access operations, the select lines are used as an address source whereas the CPU address lines are the source when registers in the PCM are directly accessed by the CPU. The CPU address lines may be applied directly to the PCM when accessing registers or these lines may be code converted to allow dispersion of the register addresses throughout the register allocation space on the Unibus. The bottom three bits of the RAM address counter/selector are used to address PCM registers under direction of the RAM control unit 108.

Included in the RAM control unit 108 is a programmable read-only memory, a state counter, input selector, and instruction decoder. The basic function of the RAM control unit is to control the DMA transfers and CPU accesses of registers in the PCM. This will be discussed in greater detail hereinafter. Also included in the RAM control unit are the controls necessary to reset the DMA circuits, initiate DMA operations, and report DMA bus, abort, and function completed status to the PCM.

The buffer address register 120 is a 24-bit register which contains the lower 16 bits of the Unibus address, 2 bits of extension address which define which 32,000-word block the buffer resides in, and 6 bits of temporary storage. Each of the three bytes which make up this register can be loaded independently by the RAM control unit 108. At the end of each DMA operation, the buffer address register is incremented by 2 with the exception of the upper 6 bits. The result of the increment may or may not be restored in a register contained in the PCM.

The output data register 122 is a 16-bit storage register used to buffer data to the Unibus. Each 8-bit byte of this register can be loaded independently by the RAM control unit 108 as 8-bit characters are received from the PCM. Outputs from the data register 122 are applied to the Unibus data receiver for application to the Unibus during DMA and register access cycles.

The input data multiplexer 124 serves to connect one of five data sources to the PCM. These data sources are:

(1) buffer address register byte 1
(2) buffer address register byte 2
(3) buffer address register byte 3
(4) input data register byte 1
(5) input data register byte 2.

Source data to be applied to the PCM data bus is selected by the RAM address counter 118 and the address interface 100. Data from the input data multiplexer 124 is accompanied by a write command from the RAM control unit 108 under program control.

The operation of the DMA of FIG. 3 will now be considered. The Unibus acquisition module 116 gains control of the Unibus when either NPR or interrupt cycles are requested. This module 116 also will pass NPR and NPR bus grants to devices further down on the Unibus. The bus control module 106 provides the timing and delays required to process NPR cycles. The sequence of control signals on the Unibus is as follows:

(1) The DMA issues a non-processor request (NPR).
(2) The CPU arbitration logic issues a bus grant.
(3) The DMA issues a bus busy signal, followed by a master sync pulse and places the address on the address lines and data on the data lines (Data OUT only).
(4) Slave device (core memory) accepts the address and places the data on the data lines by executing a read cycle (Data IN) or strobes in data with a write cycle (Data OUT) and sending a store sync.
(5) The DMA accepts the data (Data IN only), makes the bus not busy, and clears master sync.

The Unibus data interface block 114 contains a 16-bit buffer register and the necessary bus transceivers to accept and send data on the Unibus. Data is received or sent to the PCM in 8-bit characters. Data from the PCM is buffered in the data output register 122 into 16-bit words. Input data is transferred to the PCM via the input data multiplexer 124. The Unibus address is stored in the buffer address register 120 which contains 24 bits to accommodate the 16-bit address plus the two extension bits and 6 command bits. On each word transferred, the DMA increments the address and the PCM increments the word count. Therefore, the input data multiplexer 124 multiplexes the input data bytes and the buffer address bytes under control of the RAM control unit 108 and the RAM address counter 118.

The temporary data storage for data, address, status, etc. in the BR 1569 is provided by the dual-ported random access memory in the PCM, to be discussed hereinafter. The RAM control unit 108 for one port is in the DMA module of FIG. 3. It is a programmable unit that can be tailored to meet the requirements of almost any type of controller. The RAM control unit 108 contains a programmable read-only memory, state counter, input selector, and instruction decoder. The RAM control unit 108 defines the following four states:

(1) idle
(2) NPR; the PCM wants to transfer data to or from core memory
(3) restore; i.e., place address back in random access memory and write data in random access memory during Data IN
(4) RAM; store data in random access memory or read random access memory registers.

The RAM control unit 108 is capable of issuing 19 different instructions to the DMA control circuits as shown in table 1 hereinafter.

TABLE 1

| DMA Interface Instruction Set | | | | | | | | |
|---|---|---|---|---|---|---|---|---|
| | OP Code | | | | | | | |
| Instruction | 7 | 6 | 5 | 4 | 3 | 2 | 1 | 0 |
| No OP | X | X | 0 | 0 | 0 | 0 | X | X |
| Load BAR 1 | X | X | 1 | 0 | 0 | 0 | X | X |
| Load BAR 2 | X | X | 0 | 1 | 0 | 0 | X | X |
| Load BAR 3 | X | X | 1 | 1 | 0 | 0 | X | X |
| Load DR1 | X | X | 0 | 0 | 1 | 0 | X | X |
| Load DR2 | X | X | 1 | 0 | 1 | 0 | X | X |
| Func Cmp. | X | X | 0 | 1 | 1 | 0 | X | X |
| Write RAM | X | X | 1 | 1 | 1 | 0 | X | X |
| Increment BAR | X | X | 0 | 0 | 0 | 1 | X | X |
| NPR Register | X | X | 1 | 1 | 0 | 1 | X | X |
| Reset RAM Address Counter | X | X | 0 | 0 | 1 | 1 | X | X |
| Load RAM Address Counter | X | X | 1 | 0 | 1 | 1 | X | X |
| State Error | X | X | 0 | 1 | 1 | 1 | X | X |
| Issue SLAVE Sync | X | X | X | X | X | X | 1 | X |
| Increment RAM Address Counter | X | X | X | X | X | X | X | 1 |
| Jump to ST 00 | 0 | 0 | X | X | X | X | X | X |
| Jump to ST 01 | 1 | 0 | X | X | X | X | X | X |
| Jump to ST 02 | 0 | 1 | X | X | X | X | X | X |
| Jump to ST 03 | 1 | 1 | X | X | X | X | X | X |
| Unassigned | X | X | 0 | 0 | 0 | 1 | X | X |
| Unassigned | X | X | 1 | 0 | 0 | 1 | X | X |
| Unassigned | X | X | 1 | 1 | 1 | 1 | X | X |

NOTE:
X = Don't care; up to four instructions can be executed with one OP code (i.e., $1,01000011_0$ = Jump to 01, Load BAR 1, issue SLAVE Sync, and Increment RAM Address Counter).
BAR = Buffer Address Register.
DR = Output Data Register.

The storing or reading of information in the random access memory in the PCM is under control of the RAM address counter 118 in the DMA. The RAM memory in the PCM is a dualported memory which is accessed by both DMA and PCM. Each channel address is module 16 character addresses. Hence, the six 16-bit words associated with each channel are sorted in twelve 8-bit characters in RAM memory. Two additional characters hold the error conditions (one for the receive function and one for the transmit function) while two command characters allow the CPU to establish new-sync, enable interrupts or initialize the receiver or transmittor, in addition to holding the address extension bits. It should be pointed out that the RAM addresses require only 8 bits; 5 bits for channel address and 3 bits for temporary storage of data. However, 2 additional bits are provided. One bit is reserved for expansion and one bit for special discipline information.

Figure 4:
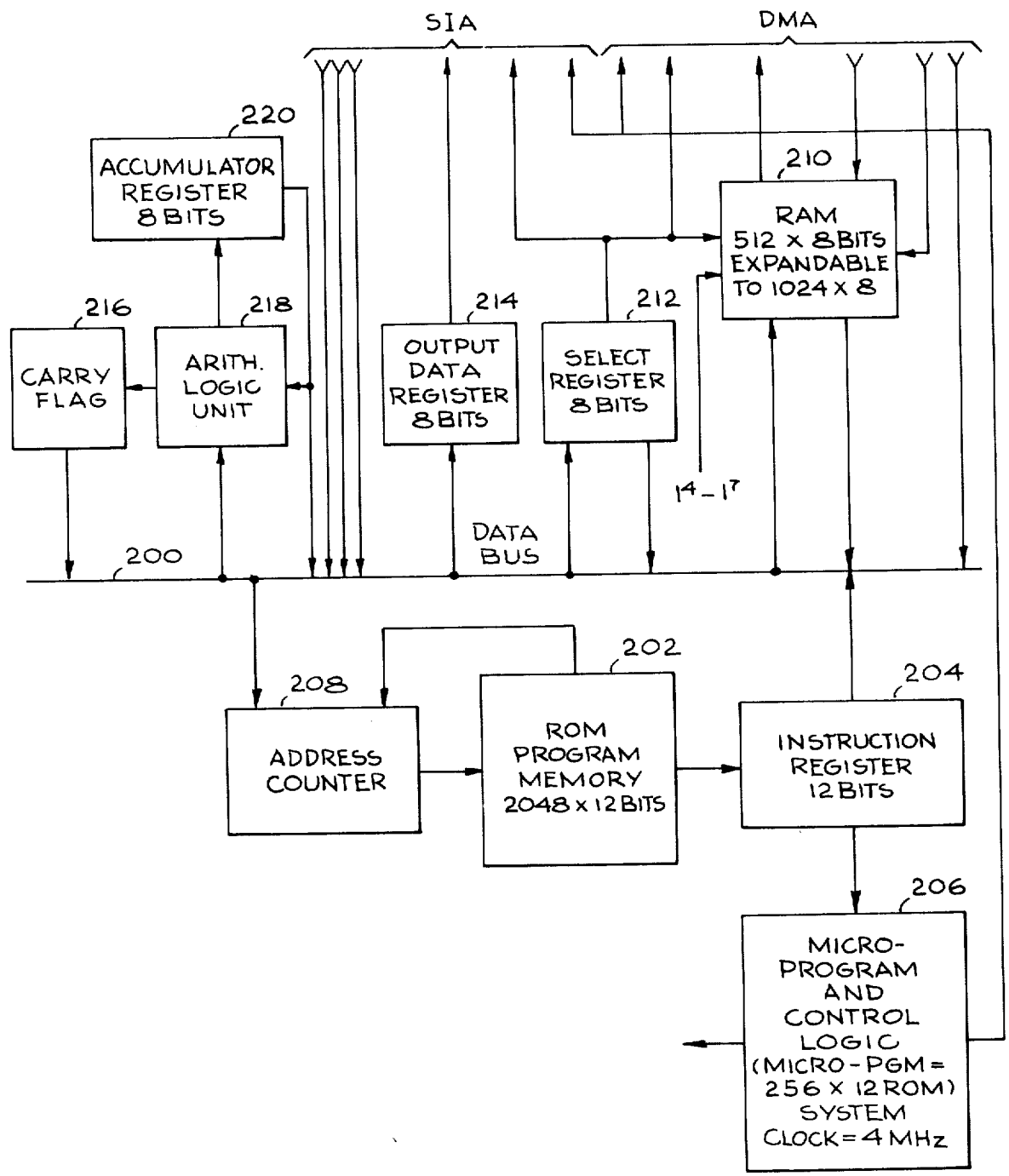
FIG. 4 is a block diagram of the programmable control module (PCM) of FIGS. 1 and 2.

Attention is now called to FIG. 4 which illustrates the programmable controller module (PCM) in significantly greater detail than its block representation FIGS. 1 and 2. The PCM is a small programmable parallel computer whose organization has been optimized for the communication control function in accordance with the invention herein. As can be seen in FIG. 4, the PCM is comprised of a plurality of blocks or elements all of which communicate with each other via an internal data bus 200. Each of the PCM elements will be described in detail hereinafter. Prior to describing the PCM elements separately, the overall characteristics of the PCM will be discussed and the instruction set considered. As noted, the PCM comprises an efficient programmable parallel computer. It utilizes a data word length of 8 bits, while the instruction and address is 12 bits in length. The PCM is a microprogrammable processor with a single data bus and arithmetic register and a dual ported RAM memory. Variable data is stored in a 512-word (expandable) 8-bit RAM memory that is addressable by the PCM data source or the DMA. Program memory is stored in a programmable read-only memory typically comprised of 2048 words by 12 bits. The microprogram instructions are stored in a separate programmable read-only memory, as will be discussed. The arithmetic unit provides the capability for the logical and arithmetic functions required.

Instructions read from the ROM program memory are executed in a maximum of three or four states, depending upon whether the RAM memory is addressed and the particular command as follows:

| State | Non-RAM Instructions | RAM Instructions |
|---|---|---|
| 0 | Read instruction | Read instruction |
| 1 | Execute or set jump condition | Address setting time |
| 2 | Execute jump | Execute or set jump condition |
| 3 | | Execute jump |

The instructions for the PCM are listed in the following table 2. It will be noted that the instruction set is relatively simple and that the instructions basically comprise a single address command to RAM address pointers. The jump bit commands are useful for testing flag conditions. In all jump commands, the jump address is in location N + 1. If no jump occurs, the address counter is incremented to address N + 2. There are 32 arithmetic commands and 16 logical commands as shown in table 3.

TABLE 2

PCM Instruction Format

| Command | OP Code | | | | | | | | | | | | Time msec |
|---|---|---|---|---|---|---|---|---|---|---|---|---|---|
| | 11 | 10 | 9 | 8 | 7 | 6 | 5 | 4 | 3 | 2 | 1 | 0 | |
| Jump (A) ± ($I_8$) | 0 | 0 | 0 | 0 | | | | OPERAND | | | | | 750 |
| Jump (A)±($I_8$) | 0 | 0 | 0 | 1 | | | | OPERAND | | | | | 750 |
| Load A | 1 | 0 | 0 | 1 | | | | OPERAND | | | | | 500 |
| Load SR | 1 | 0 | 1 | 0 | | | | OPERAND | | | | | 500 |
| Load ODR | 1 | 0 | 1 | 1 | | | | OPERAND | | | | | 500 |
| ARITH with $\overline{CIN}$ | 0 | 1 | 1 | 0 | RAM Address | | | ARITH Function | | | | | 750 |
| ARITH with CIN | 0 | 1 | 1 | 1 | RAM Address | | | ARITH Function | | | | | 750 |
| Logical | 1 | 0 | 0 | 0 | RAM Address | | | Logic Function | | | | | 750 |
| Uncond/Jump | 0 | 1 | 0 | 1 | Add:Input Port or Register | | | Upper 4 Bits of Jump Address | | | | | 500 |
| Input/Output | 1 | 1 | 0 | 0 | DMA Commands | | | SIA Commands | | | | | 500 |
| Transfer IP or R to RAM | 1 | 1 | 1 | 0 | RAM Address | | | Address Input Port or Register | | | | | 750 |
| Jump RAM Bit = P | 0 | 0 | 1 | 1 | RAM Address | | | P = 1  Address of<br>0  Bit Position | | | | | 1000 |
| Jump IF IP or R = P | 0 | 0 | 1 | 0 | Address Input Port or Register | | | P = 1  Address of<br>0  Bit Position | | | | | 750 |
| Jump Acc =, ± to (IP) or (R) | 0 | 1 | 0 | 0 | Address Input Port or Register | | | 1 =  Not Used<br>0 ± | | | | | 750 |
| Transfer (IP) or (SR) to Sink Register | 1 | 1 | 0 | 1 | Address Input Port or Source Register | | | 0  Add Sink<br>Unused Register | | | | | 500 |
| Transfer (RAM) to Sink Register | 1 | 1 | 1 | 1 | RAM Address | | | 0  Add Sink<br>Unused Register | | | | | 750 |

Note ( ) = Content

TABLE 3

Arithmetic Logic Instructions

| Function Code | Logic (φP 10) | Arithmetic-No Carry In (φP 06) | Arithmetic-Carry In (φP 07) |
|---|---|---|---|
| 0000 | $\overline{A}$ A+B | A | A Plus 1 |
| 0001 | $\overline{A+B}$ | (A+B) Plus 1 | (A+$\overline{B}$) Plus 1 |
| 0010 | $\overline{A}B$ | A+$\overline{B}$ | (A+$\overline{B}$) Plus 1 |
| 0011 | 0 | Minus 1 (2's Compl.) | 0 |
| 0100 | $\overline{AB}$ | A Plus AB | A Plus AB Plus 1 |
| 0101 | $\overline{B}$ | (A+B) Plus A$\overline{B}$ | (A+B) Plus A$\overline{B}$ Plus 1 |
| 0110 | A⊕B | A Minus B Minus 1 | A Minus B |
| 0111 | A$\overline{B}$ | AB Minus 1 | AB |
| 1000 | $\overline{A}$+B | A Plus AB | A Plus AB Plus 1 |
| 1001 | A⊕B | A Plus B | A Plus B Plus 1 |
| 1010 | B | (A+$\overline{B}$) Plus AB | (A+$\overline{B}$) Plus AB Plus 1 |
| 1011 | AB | AB Minus 1 | AB |
| 1100 | 1 | Left Shift A | Left Shift A/Carry In |
| 1101 | A+$\overline{B}$ | (A+$\overline{B}$) Plus A | (A+$\overline{B}$) Plus A Plus 1 |
| 1110 | A+B | (A+B) Plus A | (A+B) Plus A Plus 1 |
| 1111 | A | A Minus 1 | A |

A = Accumulator
B = Contents of RAM

| Register (Sink) | Code | Input/Register (Source) |
|---|---|---|
| Accumulator | 02 | Accumulator |
| Select | 03 | Select Register - Bits 6, 7 are Zeros |
| Output Data | 04 | Priority Bus |
| | 05 | Serial Input Status |
| | 06 | Serial Input Data |
| | 07 | External (DMA) Status (7) - Bit 7 is Carry from Arithmetic Instruction |
| | 10 | Zeros |

The microprogram instructions are also 12 bits in length and have been selected to perform the normal hardware logic functions. The microprogram instructions are contained in a separate read-only memory to be discussed more specifically hereinafter.

With the foregoing overview of the PCM in mind, the various elements of the PCM will now be considered and then the overall operation will be reviewed. Included in the PCM is a programmable read-only memory 202 consisting of 2048 12-bit words storing a sequence of instructions forming (1) control routines applicable to all peripheral devices and (2) character transmit/receive routines, each applicable to a particular communication discipline used by one or more of the connected peripheral devices. Instructions read out of the program memory 202 are parallel loaded into the instruction register 204 at the beginning of each instruction execution cycle. The instruction register 204 holds the instruction being executed by the PCM. Decoding and control of instruction execution is performed by the microprogram and control logic 206.

The microprogram and control logic 206 includes a 256 × 12 bit read-only memory which stores the microprogram. The microprogram generates/enables control register loading, address incrementing, memory writing, and command generation. The microprogram also controls the arithmetic/logic unit and selects data sources. The inputs to the microprogram are the opcode part of the instruction (bits 8-11) in register 204, the bit condition selector, and the compare output of the arithmetic/logic unit. An edge triggered register is used to synchronize the bit condition and compare inputs and to sequence through the states of the microprogram. Table 4 lists the outputs of the microprogram read-only memory and describes their function. The control logic in block 206 consists of a four Megahertz clock generator, a power-on resetter initialize generator, multiplexors for data source selection and bit condition detection, decoders for register load signals and instruction execution enables, and a logic circuit to generate command pulses.

TABLE 4

| Micro-Program Instructions | | |
|---|---|---|
| 1. Enable Bits (Upper 4 bits) | | |
| MNE-MONICS | BI-NARY | FUNCTION |
| A | 0 0 0 0 | No Operation |
| B | 0 0 0 1 | Load Instruction Register and Increment Address |
| C | 0 0 1 0 | Load Register (Specifyication by $I_{L3}$) |
| D | 0 0 1 1 | Increment Address |
| E | 0 1 0 0 | Load Address with/(Data Source) (Indirect Jump) |
| F | 0 1 0 1 | Load Address with/(Program ROM)(Jump) |
| G | 0 1 1 0 | Load Accumulator. Set/Clear Carry Designator |
| H | 0 1 1 1 | Load Accumulator |
| I | 1 0 0 0 | Write into RAM |
| J | 1 0 0 1 | Load Select Register |
| K | 1 0 1 0 | Load Output Data Register |
| L | 1 0 1 1 | Initiate Command(s) |
| M | 1 1 0 0 | Load External Register (Page-Memory Expand) |
| N | 1 1 0 1 | Save Address (Subroutine Jump) |
| O | 1 1 1 0 | Increment Pointer Counter. (Soubroutine Jump) |
| P | 1 1 1 1 | Load Address from Push-Down Stack and Decrement Pointer Counter (Return from Subroutine) |
| 2. A/L Mode Bits (Middle 4 bits) | | |
| MNE-MONICS | BI-NARY | FUNCTION |
| C | 0 1 1 0 | Compare Accumulator to Data Source |
| L | 1 0 0 1 | Load Accumulator from Data Source |

TABLE 4-continued

| Micro-Program Instructions | | |
|---|---|---|
| AC | 0 1 0 0 | Arithmetic - Not Carry In |
| AD | 0 0 0 0 | Arithmetic - Carry In |
| F | 1 0 0 0 | Logic Functions |
| 3. Data Source Select (Bits $2^2$, $2^3$) | | |
| MNE-MONICS | $2^3 2^2$ | DESCRIPTION |
| L | 0 0 | Input/Register Specified by Instruction Bits 0→3 |
| U | 0 1 | Input/Register Specified by Instruction Bits 4→7 |
| I | 1 0 | Instruction (Lower 8 Bits) |
| R | 1 1 | RAM (Address Specified by Select and Instruction Bits 4→7) |
| 4. Next State (Bits $2^1$, $2^0$) | | |
| STATE | $2^1 2^0$ | COMMENTS |
| 0 | 0 0 | Read Instruction |
| 1 | 0 1 | Execute Non-RAM Instructions or Set Non-RAM Jump Condition |
| 2 | 1 0 | Execute RAM Instructions or RAM Jump or Set RAM Jump Condition |
| 3 | 1 1 | Execute RAM Jump |

Continuing with a discussion of the elements of the PCM of FIG. 4, the instructions read from the program memory 202 are selected by address counter 208. The address counter 208 is 12 bits in length allowing it to address an expanded program memory of 4096 words. The address counter is incremented each time the instruction register 204 is loaded and during a jump instruction if the specified condition is not satisfied. The address counter 208 is parallel loaded during a jump instruction if the specified condition is satisfied. A power-on reset or an initialize clears the address counter to address zero.

The PCM also includes a random access memory 210 capable of storing 512 8-bit characters. Data is written into the memory during a transfer instruction in which one of its memory cells is defined as the data sink. Data is read from the memory during a transfer instruction in which one of its memory cells is defined as the data source. Memory consists of two sections, each section containing 256 8-bit characters. The sections consist of 1-bit × 256-bit random access memories operated in parallel to form an 8-bit × 256 character memory section. There is an external port into the memory 210 which can be used by the DMA, as aforementioned, to read or write into the memory 210 whenever the PCM is not using the memory 210.

Accessing the memory 210 is controlled by select register 212. The select register may be used also to select a peripheral device to be serviced, via the SIA, by the PCM. The register is loaded by means of a properly addressed load register or transfer function. The register may be read by the PCM during a transfer instruction in which it is specified as the data source. The select register specifies the most significant 5 bits of the address of the random access memory.

Output data register 214 provides an output character which is to be read by the selected peripheral device, via the SIA. The selection of the device to read the output character is made by the peripheral select register. The output data character register may be loaded by means of a properly addressed load register or transfer instruction. The register may not be used as a data source by a transfer function. An I/O command is the means by which the PCM causes a function to be initiated in the selected peripheral device. The command is generated by means of an I/O command instruction. The I/O command instruction causes any combination of the 8 command bits to pulse true for 256 nanoseconds.

The carry flag 216 is set when a carry out occurs during execution of an arithmetic instruction. A jump may use the status of the carry flag as the jump condition.

Arithmetic is performed by the arithmetic logic unit 218 and the accumulator register 220. The arithmetic logic unit combines the contents of the accumulator and the specified data source according to the function specified by the instruction register contents. The results are placed in the accumulator register 220. The accumulator register 220 is the primary operating register of the PCM. The results of all arithmetic and logic functions are placed in this register. The register may be loaded by a properly addressed load register on transfer instruction. The register may be read during a transfer instruction in which it is specified as the data source. Jump instructions may compare the accumulator with instruction, RAM, input, or other register data.

The overall operation of the PCM will now be reviewed and subsequently herein the details and flow of a typical program, as executed from program memory 202, will be discussed. From the discussion thus far, it should now be recognized that the PCM contains two read-only memories, i.e., the program memory 202 and the microprogram memory 206. The microprogram in memory 206 determines the instruction set of the PCM and may be changed to suit particular applications. The program memory 202 stores the previously mentioned firmware which, as mentioned consists of two levels. It will be recalled that level 1 of the firmware contains control programs common to all communication disciplines and level 2 of the firmware contains discipline depending programs. A typical set of firmware will be discussed in detail hereinafter.

In executing each instruction loaded into register 204, two, three, or four states of the microprogram are required depending upon the complexity of the function to be performed. As shown from the previously presented table 4, state zero is always used to load the instruction register 204 and increment address counter 208. The next state 1 is used for instruction decoding and to execute operations not requiring random access memory. During states two and three operations requiring random memory access may be executed. The firmware in the program memory 202 enables the PCM to manipulate and transfer data between two or more devices, such as the PDP 11 core memory and a selected peripheral device.

The select register 212 provides the upper five bits of the RAM address for PCM instructions, thus a specific page of RAM is selected for each I/O device selected by the select register. During states zero and 1 on the program, an external device may read or write into the RAM at any address of its choice. If this device is the DMA, the RAM may be used to store computer memory addresses, word counts, or other parameters required for DMA data transfers and interrupt generation. This external port into the RAM memory 210 allows the PDP 11 to load the RAM register or the BR 1569 to execute DMA transfers without interrupting the firmware.

Data to be transferred from the PCM to a selected peripheral device is placed in the output data register 214. Then an I/O command is used to strobe the data into the device. Data to be transferred from a selected device to the PCM is loaded into the RAM memory 210 or a register by a transfer instruction. Then an I/O may be used to acknowledge the data transfer. I/O commands may be used to initiate control functions also. Device status may be monitored by the PCM at the input ports without transferring the status to a register.

The DMA may read the memory transfer address from the RAM memory 210 using the RAM DMA port when a read or write command is received from the PCM. The data to be read or written is stored in RAM. After the data transfer is completed, the DMA will update the memory transfer address and return it to the RAM memory. The PCM updates and tests the word count. The DMA generates end of transfer interrupts when the PCM finds the word count equal to zero and sends a channel interrupt I/O command to the DMA. The DMA provides status to the PCM using an input port.

In the BR 1569, each channel is scanned sequentially by the PCM. High-speed channels may be scanned more frequently by performing a nonsequential or weighted scan. The time to scan a single channel is 8.06 microseconds. The time to test a character depends upon line protocol and the phase of the transmission cycle.

Each line has the following phases:
 (1) Enabled
 (2) Carrier on
 (3) Sync
 (4) Start of text sequence
 (5) Text
 (6) End of message sequence The first two phases can be handled easily. Line sync may be established by sending or receiving the following character sequence:
 (1) Syn, Syn
 (2) Syn, Syn, Syn Syn = $\phi$
 (3) $\alpha$ Syn, Syn, Syn Syn = $\alpha\phi$ Each initial character must be compared to the sync character and counted. $\alpha$ is a pad character of all ones.

The start of text sequence contains an unusual variety of sequences. A few of the more typical sequences are:
 (1) $\alpha$ Syn Syn DLE STX
 (2) $\phi$ SOH HEADER STX
 (3) $\phi$ DLE STX
 (4) 377 Syn, Syn, DLE, STX
 (5) $\phi$ SOH, SEL The end of message sequence varies with each line discipline. A few of these sequences are as follows:
 (1) DLE ENQ 377 DEL DEL DEL DEL
 (2) ETC, BCC or ETX BCC
 (3) ETX BCC EOT Prior to considering the operation of a typical firmware set, the SIA module, depicted in FIG. 5, will be presented. As previously mentioned, each SIA module comprises a flexible serial communication interface providing a wide range of capabilities in terms of baud rates, communication modes, interface levels, character length, and code conversion. The basic function of the SIA is to convert parallel data to serial data for transmission data to a selected peripheral device and to convert serial data into parallel data on receiving information from a peripheral device. Each SIA module contains four full duplex communication channels.

It is pointed out that other devices are known in the art which function similarly to the SIA disclosed herein to achieve similar results. It is again mentioned that the present invention is directed to the combination of the DMA, PCM, and SIA which together form a highly flexible and very useful communication control unit for handling multiple communication disciplines.

Figure 5:
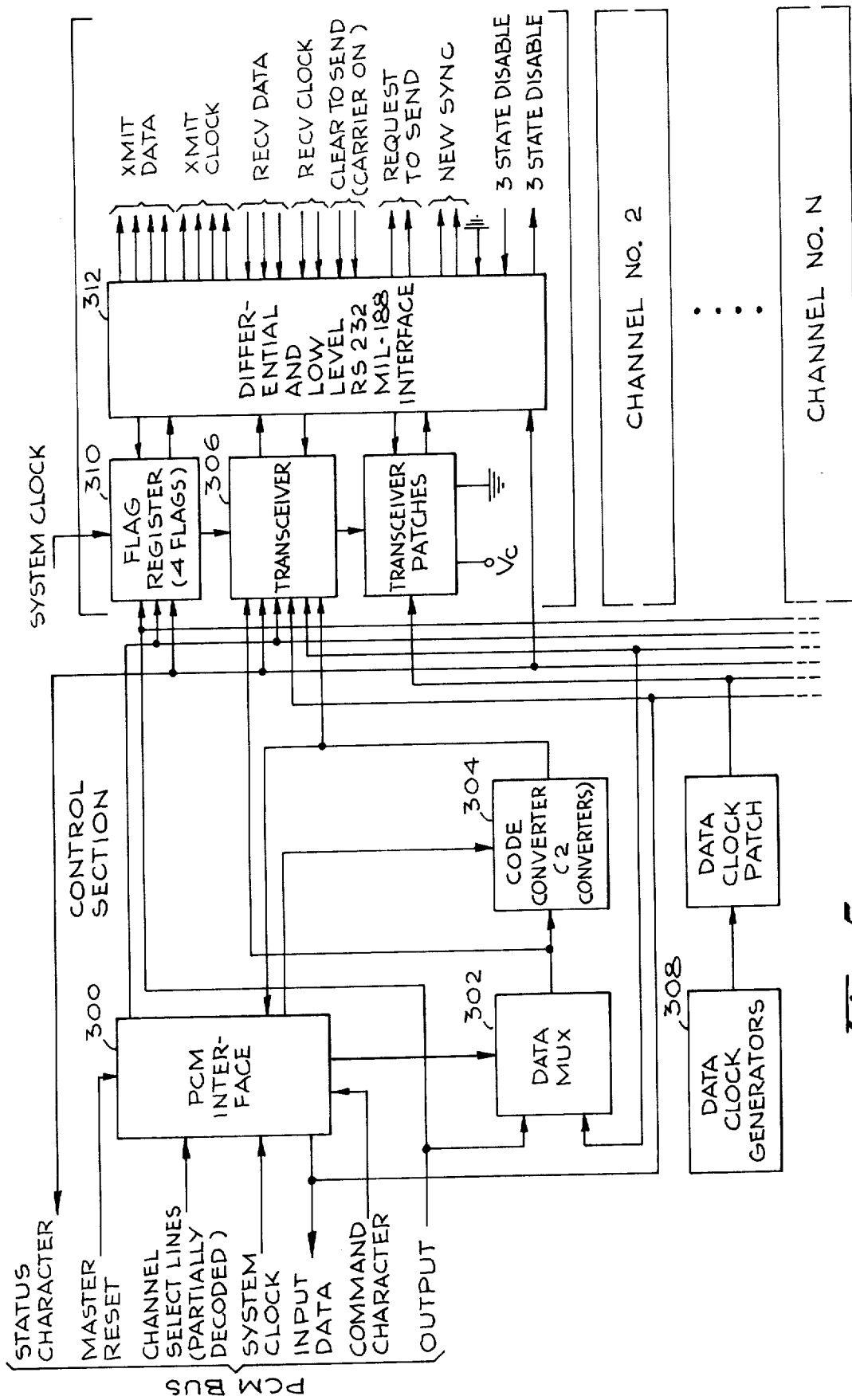
FIG. 5 is a block diagram of the serial interface adaptor module (SIA) of FIGS. 1 and 2.

Attention is now specifically directed to FIG. 5 which illustrates the major elements of an SIA module. The SIA module includes a PCM interface block 300 which functions to decode the PCM commands and select register addresses. The PCM commands the SIA via an I/O command as shown in Table 2. The lower four bits of the command are decoded as shown in Table 5.

TABLE 5

Command Bit Decoding

| Command Bit<br>3 2 1 0 | Definition |
| --- | --- |
| 1 1 1 1 | Load Sync Detect character into selected channel |
| 1 1 1 0 | Load Control Word into selected channel |
| 1 1 0 1 | Restart Timer of selected channel |
| 1 1 0 0 | Reset Status Register of selected channel |
| 1 0 1 1 | Load Flag Register of selected channel |
| 1 0 1 0 | Load Transmitter Register of selected channel |
| 1 0 0 1 | Receive Transfer Acknowledge to selected channel |
| 1 0 0 0 | Load Idle Fill character into selected channel transmitter |
| 0 X X X | No Command to Decode |

The PCM herein is capable of interfacing with four SIA modules, only one of which is illustrated in FIG. 5. Since each SIA module provides four full duplex channels to peripheral devices, a PCM with four SIA modules coupled thereto can interface with 16 full duplex channels. The PCM interface module 300, in addition to docoding PCM commands as depicted in the aforesaid fourth Table 5, also decodes channel select addresses as shown in the following Table 6.

TABLE 6

Channel Select Decoding

| Channel Select Bits<br>5 4 3 2 1 0 | Definition |
| --- | --- |
| 1 X X X X X | Code convert selected channels data |
| 0 X X X X X | Perform no code conversion |
| X 1 1 X X X | Select SIA Module No. 4 (channels 13-16) |
| X 1 0 X X X | Select SIA Module No. 3 (channels 9-12) |
| X 0 1 X X X | Select SIA Module No. 2 (channels 5-8) |
| X 0 0 X X X | Select SIA Module No. 1 (channels 1-4) |
| X A B 1 1 X | Select channel D of SIA Module AB |
| X A B 1 0 X | Select channel C of SIA Module AB |
| X A B 0 1 X | Select channel B of SIA Module AB |
| X A B 0 0 X | Select channel A of SIA Module AB |
| X A B C D 1 | Select transmit portion of channel CD of Module AB |
| X A B C D 0 | Select receive portion of channel CD of Module AB |

Note in Table 6 the sixth bit is used to denote code conversion if required, while the zero bit is used to specify transmission or receiving. The remaining four bits are used to select one of four SIA modules and one of four channels on each SIA module. Data is set to the SIA output channels via I/O commands and transfer commands. The output data is sent to the multiplexor 302 which by-passes the code converter 304, if necessary. An X I/O command loads this data into the transceiver 306. On receiving, the input data channel is selected by the multiplexor 302, by-passes the code converter if necessary, and data is sent to the interface module 300 as an input to the PCM. The input data lines are buffed for four SIA modules. Therefore, no SIA places on the input lines until it has been addressed.

Each SIA channel can be interrogated to determine status. The definition of the status bits are given in Table 7. The timer status bit in conjunction with bit 4 is used to generate a sync-search pulse in synchronous operation, or the time between characters in asynchronous operation. The transmit data transfer request status bit requests another character from the PCM for transmission. If the character is not received in time, the SIA generates idle fill characters for synchronous transmission, or marking bits for asynchronous transmission.

The receive parity error bit indicates a receiving parity error. The overrun status bit indicates the transceiver received another character before the PCM accepted the previous character, which is indicated by a transfer acknowledge command from the PCM. The receive data transfer request indicates to the PCM that the SIA has received another character. The carrier on status bit is typically a modem interface signal to indicate that the modem carrier is on and the clear to send status bit

TABLE 7

Status Characters

| Status Character Bits | Definition |
| --- | --- |
| 7 | Selected channel time-out |
| 6 | Selected channel transmit data transfer request |
| 5 | Select channel receive parity error |
| 4 | Selected channel receiver over-run error |
| 3 | Selected channel receive data transfer request |
| 2 | Selected channel receiver framing error |
| 1 | Selected channel carrier on |
| 0 | Selected channel clear to send | indicates that the modem can accept data.

In servicing high-speed data channels, an alternate receive data transfer request status bit may be used. This status bit immediately notifies the PCM that a character has been received without encountering scanning delays necessary for selection.

Each SIA module contains a clock generator 308 which generates transmit and receive clocks by dividing down the frequency of a crystal oscillator (not shown).

The code convertor 304 consists of two read-only memories for transmit and two read-only memories for receive. The PCM data character or the SIA receive character is used as an address to the ROM location which contains the converted character.

Each SIA channel contains a flag register 310 and time out circuitry that holds: request to send, new sync, disable sister channel, and sync search enable.

Each SIA channel further contains line driver and receiver circuits 312 to interface with the required output or input characteristics of the peripheral devices to be connected to the SIA output channels.

The foregoing description generally defines the significant structural and functional aspects of the three primary sections of a preferred communication control unit (BR 1569) in accordance with the present invention. The three primary sections, of course, being DMA, PCM, and SIA. Now prior to discussing a typical set of firmware and the manner in which it is used in the PCM to achieve a highly flexible communication discipline capability, the broad software aspects significant in relating the operation of the BR 1569 CCU to the PDP 11 system will be considered. The BR 1569 is supported by device handler software that operates with the PDP 11 RXS-11D real time operating system for on-line operations. The BR 1569 device handler is independent of line disciplines and will control any number of channels, up to 128 full duplex mode. Each BR 1569 channel is assigned a unit number in the physical unit device table at system generation time. The device handler operates as a priveledged task performing all input/output control for the BR 1569. Interface to user tasks and/or line discipline tasks is via the standard Queue I/O directive of RXS-11D. The form of the Queue I/O directive and a listing of the function code serviced by the device handler are shown in Table 8 and 9.

There are eight BR 1569 registers implemented for each duplex channel and one register implemented for each group of 16 channels. The registers exist physically in the PCM RAM memory 210. However, they are addressed just as if they were in system core memory. The eight registers used for each channel are the:

(1) Receiver Data Register
(2) Receiver Buffer Address Register
(3) Receiver Word Count Register
(4) Receiver Command and Status Register
(5) Transmitter Data Register
(6) Transmitter Buffer Address Register
(7) Transmitter Word Count Register
(8) Transmitter Command and Status Register The receiver data register is used to assemble received characters into computer words. The receiver buffer address register contains the address of a message buffer in core memory.

TABLE 8

Queue I/O Directive Format

| Nord | Byte | Contents | Meaning |
|---|---|---|---|
| 0 | 0 | DIC | Directive identification code for queue I/O |
|  | 1 | DPB Size | Directive parameter block size in words |
| 1 |  | Function Code | See Table 4-12 |
| 2 |  | Logical Unit | Logical unit number assigned to a channel |
| 3 | 0 | Event flag # | Event flag to set upon completion |
|  | 1 | Priority | Priority of request |
| 4 |  | Address of status | Address of a two-word status block to be set upon completion of I/O or error condition |
| 5 |  | AST Vector | Asynchronous System Trap address to return control to upon completion |
| 6 |  | Parameter 1 | Buffer address of READ/WRITE buffer (optional) |
| 7 |  | Parameter 2 | Buffer length in bytes (optional, even number) |
| 8 |  | Parameter 3 | STD address of task containing buffer (optional) |

TABLE 9

| Function | I/O Function Codes Serviced | |
|---|---|---|
|  | Code | Meaning |
| Kill | 12 | Kill all current I/O and requests for this task |
| I/O Rundown | 22 | Same as Kill except done by EXEC to aborted tasks |
| Unload | 42 | Complete all current requests, then exit the system (from EXEC only) |
| Write | 400 | Output the specified buffer to the line specified by the logical unit number assignment |
| Write/Resync | 420 | Resynchronize with crypto gear, then perform WRITE |
| READ | 1000 | Set the specified input line buffer address and length to the address and length in parameters 1, 2, and 3 |
| Read/New Sync | 1020 | Notify modem to expect new synchronization (for polling a new device) and then READ |
| Attach | 1400 | Accept I/O commands for specified line from this task only |
| Detach | 2000 | Release attached task from specified line |
| Set Disable Bit | 2410 | Disable Redundant Channel (for BR-1569s running in parallel, stops transmission from other channel) |
| Set Idle Sync Bit | 2420 | Start continuous idle synchronization of channel |

TABLE 9-continued

| Function | I/O Function Codes Serviced | |
|---|---|---|
|  | Code | Meaning |
| Set Both Bits | 2430 | Does both DISABLE and IDLE SYNC |
| Reset Disable Bit | 3010 | Enables redundant channel |
| Reset Idle Sync Bit | 3020 | Stops continuous idle synchronization |
| Reset Both Bits | 3030 | Does both Enable and stop IDLE SYNC |

A buffer full condition exists when the receiver word count register is incremented to zero. This condition is called an overflow of the word count register and initiates an interrupt of the central computer. The receiver command and status register is used to control the receiver, to report the status of completed tasks, and contains bit 16 and 17 of the address contained in the receiver buffer address register. Receiver interrupts of the central computer are generated upon any of the following conditions, whichever occurs first:

(1) Detection of the end of message sequence.
(2) Overflow of the receiver word count register.
(3) Receiver time out.
(4) Any error.

The corresponding registers for the transmitter operate in an analogous fashion. Transmitter interrupts of the central computer are only generated on overflow of the word count register.

In addition to these eight registers per channel, there is a channel address register associated with each group of 16 channels. When a central computer interrupt is generated and control is transferred to the address specified in the address vector located at the interrupt vector address, the channel address register is accessed by the interrupt routine to determine which of the peripheral devices initiated the interrupt. With this information, the appropriate register set can then be addressed.

Reference has previously been made to the program stored in the read-only program memory 202 of the PCM (FIG. 4). This program or firmware constitutes the primary control element of the BR 1569 and consists of two levels of instructions; the first level instructions comprise a control program which contains routines common to all channels regardless of discipline, as well as a control program which is used by all disciplines and the second level contains all discipline dependent instructions associated with the processing of transmit or receive characters according to a particular communications discipline. Thus, the second level firmware may, for example, be partitioned into six different routines each for handling a different communication discipline. Typical communication disciplines known in the art are:

| | |
|---|---|
| COINS | COMMUNITY ON-LINE INTEL. NET SERVICE |
| VIP | VISUAL IMAGE PROJECTION TERMINAL (HONEYWELL) |
| DN355 | DATA-NET 355 (HONEYWELL) |
| BAUDOT TTY | ITA No. 2 TELETYPEWRITER |
| ASCII TTY | ASCII TELETYPEWRITER - ODD OR EVEN PARITY |
| PT-PT | POINT-TO-POINT |
| BISYNCH | BINARY SYNCHRONOUS ASCII OR EBCDIC |
| CHARACTER | CHARACTER INTERFACE |
| RLP300 | REMOTE LINE PRINTER 300 (HONEYWELL) |
| SYSTEM 1 | UNIVAC 1652 TERMINAL |
| GENSER | AUTODIN GENERAL SERVICE PORT |
| SYSTEM 2 | COLLECTION SYSTEM 2 |
| WUPTC | WESTERN UNION PROGRAMMABLE TERMINAL |

| | |
|---|---|
| | CONTROLLER (AUTODIN) |
| DN30 | DATA-NET 30 (HONEYWELL) |
| DACOM | DACOM FACSIMILE UNIT |
| 188C TTY | MILITARY TELETYPEWRITER |
| DP2910 | DATA PRODUCTS 2910/MIL/TEMPEST LINE PRINTER |
| D900A | VERSATEC PRINTER/PLOTTER |
| DDCMP | DIGITAL EQUIPMENT CORPORATION DDCMP |
| SYSTEM 3 | COLLECTION SYSTEM 3 |
| SYSTEM 4 | COLLECTION SYSTEM 4 |
| SYSTEM 5 | COLLECTION SYSTEM 5 |
| SYSTEM 6 | COLLECTION SYSTEM 6 |
| SYSTEM 7 | COLLECTION SYSTEM 7 |

A typical BR 1569 has a greater number of channels than it has discipline dependent routines stored in firmware and thus in a typical application, peripheral devices on several channels will use the same discipline. For example only, in a typical application of a BR 1569, it may be necessary to couple a Remste Line Printer 300, a Visual Image Projection Terminal and several Teletypewriters to a PDP 11. The printer and terminal would, for example, operate in accordance with the RLP300 and VIP disciplines, respectively, and the Teletypewriter in accordance with ASCII TTY. Firmware for the BR 1569 has been developed for a number of different disciplines and subsequently herein, the firmware for an exemplary discipline aforementioned ASCII TTY will be set forth along with the first level firmware containing the common routines.

Figure 6:
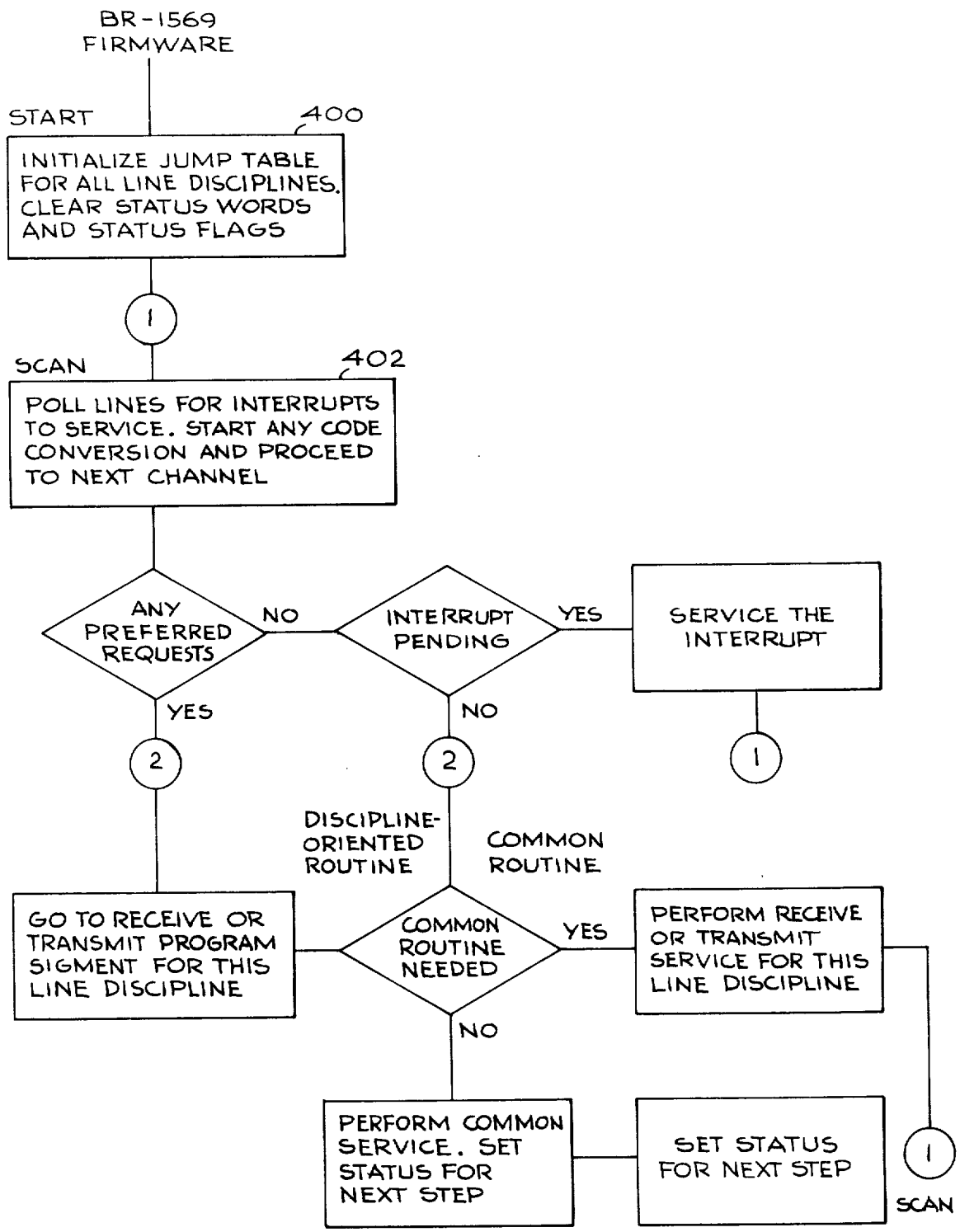
FIG. 6 is a flow diagram depicting the firmware program processing.

One of the primary purposes of utilizing a communications control unit in accordance with the invention is to perform many of the tasks associated with servicing a peripheral device without requiring the intervention of the PDP 11 CPU. Thus, under the control primarily of the first level of firmware, the BR 1569 augments the throughput of the system by providing automatic message handling capabilities and data transfer prior to interrupting the central computer. Typical services performed by the firmware are:
. Cyclic servicing of each channel
. Automatic synchronization of synchronous channels
. Recognition of control characters framing message blocks
. Automatic computation of longitudinal parity checks (block check characters), if required
. Insertion of block check characters in transmitted data, if required
. Comparison of computed and received block check characters, if required
. Maintenance of hardware registers for each channel
. Control the transfer of words to and from core memory buffers
. Control redundant channels
. Furnish control of modems or cryptographic equipments
. Provide for code conversion to and from ASCII, if required
. Strip extraneous characters, such as synchronous idle
. Timeout receiver channels
. Mask output characters to desired character length
. Generate interrupt at task completion or error condition
. Error detection and status register maintenance The control exercised by the control and common programs at the first level of firmware are those functions listed above that are independent of the structure of communicated messages. FIG. 6 shows the general processing flow for the firmware and the appendices hereto show the flow in considerably greater detail. Appendix A(1) comprises the instruction listings for the first firmware level and Appendix A(2) shows the corresponding flow chart. Appendix B(1) comprises the instruction listings for an exemplary routine in the second level of firmware, specifically relating to the communication discipline ASCII TTY, even parity. Appendix B(2) shows the corresponding flow chart.

As represented in FIG. 6, first level firmware processing is basically comprised of a START routine 400 and SCAN routine 402. In the START routine 400, various initializing actions are taken prior to control passing to the SCAN routine. In the SCAN routine, the status of each channel is pulled and interrupts are serviced directly or by steering to the appropriate discipline dependent routine in firmware level 2. Interrupts are served in the following order:

1. Initiate service for a weighted scan (requires code converter) or a sequential scan, depending on the throughput requirement.

2. If no interrupt is pending for the next line in the round robin list, enter the line discipline service routine and check status for that line.

3. If an interrupt is pending and interrupts are not enabled, reset the interrupt pending status indicator.

4. If interrupts are enabled and not blocked, send an interrupt to the main processor for transfer of input or output signals from the BR 1569.

5. Resume SCAN routine each time a firmware action is completed.

Execution of the first level of firmware also may involve some common receive and transmit routines which are the same for all disciplines. These routines set or clear status bits, store or save variable-type information in predefined random-access memory locations, and perform processes that are independent of line discipline requirements.

In order to understand the detailed operations controlled by firmware level one, attention is directed to Appendix A(1) comprising the program listing. The following table is set forth to explain the instruction mnemonics utilized:

| 1569 Instruction Mnemonics | | | |
|---|---|---|---|
| 0.75 | ARC | R0, F0 | Arithmetic Functions with Carry In Result in Accumulator Register and RAM location R0 used as operands for function F0 (Table I). |
| 0.75 | ARN | R3, F12 | Arithmetic Functions Without Carry In (See above and Table I) |
| 0.75 | JAE | Op, Addr | Jump to Addr if contents of accumulator, (A) equals op. |
| 0.75 | JAN | Op, Addr | Jump to Addr if (A) $\neq$ Op (A) = Inp, for E=1 |
| 0.75 | JIA | Inp, E, Addr. | Jump to Addr if (A) = Inp, for E=0 |
| 0.75 | JIE | Inp, P, Z, Addr | Jump to Addr if bit Z, 0-7, of Inp = Off = 0 |

-continued

| | | 1569 Instruction Mnemonics | |
|---|---|---|---|
| 0.5 | JMP | Inp, Addr | P<br>On = 1<br>Jump to Addr/Inp; Addr = upper 4 bits of jump address<br>(Inp) = lower 8 bits of jump address |
| 1.0 | JRE | RAM,P, Z, Addr | Jump to Addr if bit Z, 0-7, of RAM location RAM = Off=0<br>P<br>On −1 |
| | | | Logical functions, result in Accumulator (See Table I). |
| 0.75 | LGC | R12, F17 | Register and RAM location R12 used as operands for function F17. |
| 0.5 | LOA | L | Load Accumulator with literal L |
| 0.5 | LOO | L | Load Output Register with literal L |
| 0.5 | LOS | L | Load Select Register with literal L |
| 0.75 | TIR | RAM, SOURCE | Transfer data from input port SOURCE to RAM location RAM |
| 0.5 | TIS | SOURCE, SINK | Transfer data from SOURCE input port register to SINK register |
| 0.75 | TRS | RAM, SINK | Transfer data from RAM location RAM to selected register SINK |
| 0.5 | XIO | CMD | Execute I/O command. Each command line activated if the corresponding bit of CMD is on (bits 0 - 7).<br>Bits 4 - 7 = DMA commands; bits 0 - 3 = SIA commands. |

Appendix A(1) first sets forth a list of "General Firmware Constant Definitions" and then on page 0006 the instruction sequence required for the initialization routine. The initialization procedures include:

1. Saving offset to jump table in JTBL.
2. Saving channel O in select save.
3. Resetting command word. 4. Setting the ready status bit (clearing error bits).
5. Initializing the serial adaptor flag register.
6. Clearing program flgs (FLG1).
7. Save (A) select address of transmitter in receive channels or (B) select address of receiver in transmit channels. (This allows easy jumping from Xmit to Recv. or Recu-Xmit).

Appendix A(1) next lists on page 0007 the instruction sequence of the SCAN routine. The scan routine first selects the channel which contains the last scan count used. The scan count is then code converted to the channel select to be scanned. If no code converter is present, a sequential scan is performed. If a code converter is present, the scan count is first converted to the select count, then the channel is scanned.

When an interrupt is pending, and interrupts have been enabled and interrupts are not temporarily blocked, the central processor is interrupted.

If interrupts are not enabled, no interrupts occurs and the interrupt pending bit is cleared.

If interrupts are temporarily blocked, the next channel is scanned.

The SCAN routine can cause a jump to an entry point in the second level of firmware by addressing one of the Line Discipline Entry Points defined on page 0004 of Appendix A(1). The common receiver and transmitter routine listings begin on pages 0010 and 0014 respectively.

Appendix B(1) lists the instructions for a typical discipline dependent program; i.e., ASCII TTY. This instruction sequence can be entered as a consequence of a jump executed during the SCAN routine.

The program represented by Appendix B(1) furnishes an interface on asynchronous channels to teletypewriters using ASCII coded characters. These characters can have odd or even parity and the program for even parity is shown. The message structures recognized by this firmware are:

Text CR
Text ETX
Text EOT, or
Text DC4

CR, ETX, EOT, DC4 respectively identify a "carriage return", "end of text", "end of transmission" and "device control 4" character. The end-of-transmission interrupt of the central computer is generated on overflow of the word count register. The end-of-reception interrupt of the central computer is generated on reception of CR, ETX, EOT or DC4.

From the foregoing, it should be recognized that a versatile communication control unit has been disclosed herein capable of handling a plurality of peripheral devices observing multiple communication disciplines. It is recognized that various modifications and revisions will occur to those skilled in the art falling within the scope of the appended claims. For example only, the read only program memory disclosed herein in the PCM can be replaced with a read/write memory to provide the capability of loading the program memory from the central processor via the Unibus or externally via a communication line. This feature allows changing the control program under external program control and is particularly useful, for example, for program debugging of communication disciplines.

What is claimed is:

1. In a communication control unit, useful in a data processing system having a central processing unit coupled to a main memory, and having a plurality of peripheral devices, each for communicating with said data processing system and each capable of handling messages in accordance with a different communication discipline, said communications control unit responding to messages from each peripheral device and transmitting messages to each peripheral device in accordance with the discipline defined therefor, said communication control unit comprising:

a programmable controller module including:
program memory means including a plurality of locations each storing an instruction, with sequences of instructions forming (1) control routines common to all peripheral devices and (2) character transmit/receive routines each unique to a particular communication discipline used by one or more of said peripheral devices;

instruction register means;

program address counter means for identifying a location in said program memory means and for transferring the instruction stored therein to said instruction register means;

a read/write memory means for storing data;

a data bus comprised of parallel bit lines;

means responsive to instructions transferred to said instruction register means for operating on data either in said read/write memory means or appearing on said data bus;

a direct memory access module means responsive to instructions transferred into said instruction register for transferring data from said read/write memory to said main memory and from said main memory to said read/write memory; and an interface adaptor means coupled between said programmable controller parallel data bus and said peripheral devices for receiving data from and transmitting data to said peripheral devices serial by bit.

2. The communications control unit of claim 1 wherein said control routines contain jump instructions identifying addresses of the starting locations in each of said character transmit/receive routines; and means responsive to the transfer of one of said jump instructions into said instruction register means for loading the identified address of the starting location of a character transmit/receive routine into said address counter.

3. A data processing system having a central processing unit coupled to a main memory, and having a plurality of peripheral devices, each coupled for communicating with said data processing system and each capable of handling messages conforming to a different communication discipline, the improvement comprising a communication control unit for responding to messages conforming to each of said different disciplines and for transmitting to each of said peripheral devices messages conforming to the discipline handled by that peripheral device, said communication control unit comprising:

program memory means including a plurality of individually addressable locations each storing an instruction, said instructions being arranged in sequential locations to form (1) control routines common to all peripheral devices and (2) transmit/receive routines each unique to a different one of said communication disciplines;

instruction register means;

address counter means for addressing a location in said program memory to transfer the instruction stored therein to said instruction register means;

a read/write memory means for storing data;

means responsive to instructions transferred to said instruction register means for operating on data stored in said read/write memory means; and direct memory access means responsive to instructions transferred into said instruction register means for transferring data from said read/write memory means to said main memory and from said main memory to said read/write memory.

4. The data processing system of claim 3 including means for periodically incrementing said address counter means by a fixed count; and wherein said control routines contain jump instructions identifying addresses of the locations storing the starting instruction in each of said transmit receive routines; and means responsive to the transfer of one of said jump instructions into said instruction register for loading the identified address of the starting location into said address counter means.

5. The data processing system of claim 4 including a data bus of parallel bit lines;

means for transferring information from said read/write memory means to said data bus; and interface adaptor means coupled between said data bus and said peripheral devices for receiving data from and transmitting data to said peripheral devices serial by bit.

* * * * *